United States Patent
Orcine et al.

(10) Patent No.: US 7,729,370 B1
(45) Date of Patent: Jun. 1, 2010

(54) APPARATUS FOR NETWORKING DEVICES HAVING FIBRE CHANNEL NODE FUNCTIONALITY

(75) Inventors: Jairone A. Orcine, Tracy, CA (US); Ricardo H. Bruce, Union City, CA (US)

(73) Assignee: BiTMICRO Networks, Inc., Fremont, CA (US)

( * ) Notice: Subject to any disclaimer, the term of this patent is extended or adjusted under 35 U.S.C. 154(b) by 861 days.

(21) Appl. No.: 11/495,868

(22) Filed: Jul. 28, 2006

Related U.S. Application Data

(60) Provisional application No. 60/710,787, filed on Aug. 19, 2005.

(51) Int. Cl.
*H04J 1/16* (2006.01)
*H04L 12/56* (2006.01)

(52) U.S. Cl. .................. 370/419; 370/216; 370/463

(58) Field of Classification Search .................. 370/419, 370/463, 216, 241; 710/317
See application file for complete search history.

(56) References Cited

U.S. PATENT DOCUMENTS

| | | | |
|---|---|---|---|
| 6,112,276 A | 8/2000 | Hunt et al. | |
| 6,751,699 B1 | 6/2004 | Langley et al. | |
| 2005/0018663 A1* | 1/2005 | Dropps et al. | 370/360 |
| 2005/0191053 A1* | 9/2005 | Levinson et al. | 398/25 |

* cited by examiner

*Primary Examiner*—John Pezzlo
(74) *Attorney, Agent, or Firm*—Stephen R. Uriarte

(57) ABSTRACT

This invention relates to data networks, and more particularly, to platforms, modules and systems for networking at least one device having Fibre Channel node functionality with another device. Networking of Fibre Channel-enabled devices is provided by an apparatus that includes a circuit board having a first set of signal paths; a first transceiver having a first optical I/O port, a first transceiver output and a first transceiver input; a first I/O connection for coupling to a first Fibre Channel port and for receiving signals transmitted by the first transceiver output via a subset of the first set of signal paths; and a second I/O connection for coupling to a second Fibre Channel port and for receiving signals from the first Fibre Channel Port.

49 Claims, 8 Drawing Sheets

APPARATUS FOR NETWORKING DEVICES HAVING FIBRE CHANNEL NODE FUNCTIONALITY

CROSS-REFERENCE TO RELATED APPLICATIONS

This application claims the benefit of United States provisional patent application, entitled "Apparatus for Networking Devices Having Fibre Channel Node Functionality", having Ser. No. 60/710,787 and the filing date of 19 Aug. 2005.

FIELD OF THE INVENTION

This invention relates to data networks, and more particularly, to platforms, modules and systems for networking at least one device having Fibre Channel node functionality with another device.

BRIEF SUMMARY OF THE INVENTION

Networking of Fibre Channel-enabled devices is provided by an apparatus that includes a circuit board having a first set of signal paths; a first transceiver having a first optical I/O port, a first transceiver output and a first transceiver input; a first I/O connection for coupling to a first Fibre Channel port and for receiving signals transmitted by the first transceiver output via a subset of the first set of signal paths; and a second I/O connection for coupling to a second Fibre Channel port and for receiving signals from the first Fibre Channel Port.

DETAILED DESCRIPTION OF THE INVENTION

While the invention has been described in conjunction with a specific best mode, it is to be understood that many alternatives, modifications, and variations will be apparent to those skilled in the art in light of the following description. Those skilled in the art would recognize after reviewing this application that the embodiments disclosed, including embodiments directed to methods or processes, can be implemented using various types of integrated circuits, including microprocessors, programmable logic arrays, such as a FPGA, discrete active and passive devices, such as logic gates and logic functions, or any combination of these devices. The use of these devices in the embodiments of the invention shown below would not require undue experimentation or further invention.

Figure 1:
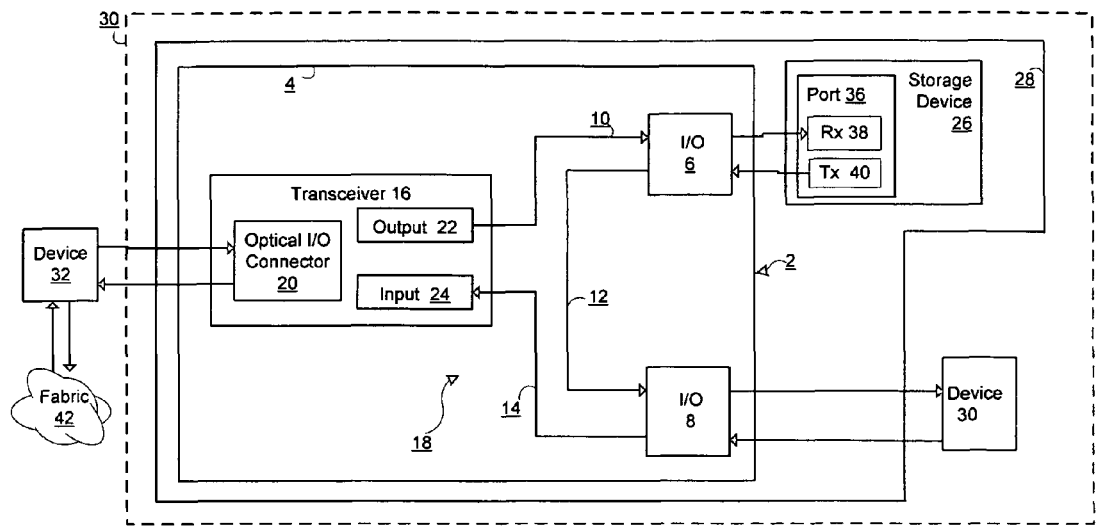
FIG. 1 is a block diagram of a platform, module and system for networking Fibre Channel compliant devices in accordance with a first embodiment of the present invention.

FIG. 1 is a block diagram of one example of a platform, module and system for networking devices that support the Fibre Channel protocol. Platform 2 includes a circuit board 4, I/O connections 6 and 8, a set of signal paths 10, 12 and 14 and a transceiver 16, which form a network 18 for connecting devices having Fibre Channel node functionality. Circuit board 4 may be implemented by using a multilayer printed circuit board, providing more than one surface on or through which signal paths 10, 12 and 14 may be routed. Circuit board 4 also provides a physical medium to which I/O connections 6 and 8 and transceiver 16 may be attached. Transceiver 16 includes an optical I/O connection 20, output 22 and input 24.

Connecting a device, such as storage device 26, to one of the I/O connections of Platform 2 forms a storage module 28. Connecting storage module 28 to additional devices, such as devices 30, 32 or both, creates a storage system 34. Device 30 is shown connected to I/O connection 8, while device 32 is shown connected to optical I/O connection 20.

The term "Fibre Channel" is an open T11 and ANSI standard for a group of standards that define the protocol and architecture for the transfer of data between or among a group of devices. The Fibre Channel standard defines a networking architecture to which these Fibre Channel compliant devices attach. Storage device 26 includes a device interface (not shown) that operates as a Fibre Channel node. Under the Fibre Channel standard, a Fibre Channel node ("Node") is a device that operates on a network having a topology that complies with the Fibre Channel standard and that has at least one Fibre Channel port ("Port"). A Port provides access to other Nodes operating on the Fibre Channel network. Each Port on a Fibre Channel network connects to a receiving signal path and a sending signal path. In the embodiment shown, storage device 26 is a Node having a Port 36. Port 36 includes a receiver 38 that receives Fibre Channel signals from Network 18 via I/O connection 6, and a transmitter 40 that sends Fibre Channel signals to Network 18 via I/O connection 6. The receiving and sending paths that are connected to a Port are collectively referred to as a Fibre Channel link ("Link"). Signal paths 10 and 12 form the Link to Port 36 when storage device 26 is connected to I/O connection 6.

Network 18 forms a network topology referred to as a Fibre Channel Arbitrated Loop (FC-AL) network when it interconnects Nodes having FC-AL functionality. Each Node includes a Port that can support the FC-AL network topology. The types of Ports that can support a FC-AL network include
} a NL-type Port ("NL Port"), a FL-type Port ("FL Port") and a GL-type Port ("GL Ports"), which are hereinafter collectively referred to as "L Ports".

Storage device 26 provides NL Port functionality through Port 36 and is implemented using a solid-state Fibre Channel storage device having a 3.5" hard disk drive ("HDD") form factor, which is available from BiTMICRO® Networks, Inc. of Fremont, Calif., USA. The use of a solid-state Fibre Channel storage device having 3.5" HDD form factor is not intended to limit the present invention in any way. Other types of Fibre Channel storage devices, including storage devices that use rotating magnetic media, may be used as long as such storage devices can be coupled and decoupled to at least one of the I/O connections provided by platform 2 as needed by a user of platform 2. The availability of coupling and decoupling a Fibre Channel storage device to one of the I/O connections enables the user to select a mass storage capacity for storage module 28 that can later be changed without replacing platform 2. In addition, Fibre Channel mass storage device having other form factors may be used, including those in the 2.5" HDD form factor and other form factors that may later be made available for Fibre Channel storage devices, as long as such storage devices are selected to have Ports that can couple with the I/O connections provided by platform 2.

Device 30 may be implemented as a Node having an NL Port. The NL Port (not shown) receives Fibre Channel signals from signal path 12 and transmits Fibre Channel signals to input 24 via I/O connection 8 and signal path 14 in accordance with the Fibre Channel standard. Device 32 provides L Port functionality although this functionality may be provided through the use of a Node having a NL Port, FL Port or GL port. Limiting Device 32 to a NL Port creates a private loop. If device 32 includes a FL Port (not shown), it would render Network 18 a public loop, enabling Nodes, such as storage device 26 and device 30, that are attached to I/O connections 4 and 6 to become part of another Fibre Channel network or fabric 42.

When attached to network 18, a Node through its Port can receive or send signals to other Nodes on the loop, including a Node attached to optical I/O connection 20. A Node receives all signals (e.g., signals representing Fibre Channel packets or messages) that are transmitted on network 18 and retransmits those packets not addressed to its Port. Normally, only two L Ports may communicate at a time, and when the pair of communicating Ports releases the FC-AL network, another pair of L Ports may gain control of the FC-AL network through arbitration.

The embodiment disclosed in FIG. 1 permits devices 26, 30 and 32 to transmit and receive information to each other as defined by the Fibre Channel standard. The transmission of Fibre Channel packets or messages between Nodes on a Fibre Channel compliant network is known by those of ordinary skill in the art. In addition, after reviewing the embodiments of the invention disclosed herein, those of ordinary skill in the art would recognize that the use of an arbitrated loop topology should not limit the scope and spirit of the appended claims to the use of an arbitrated loop or L Ports since the Fibre Channel standard also defines and permits the use of other types of topologies, including point-to-point, and switched fabric topologies. Although a FC-AL network may be unidirectional, the direction of the transmission of Fibre Channel signals under the arbitrated loops disclosed herein are not intended to be limited to the direction of travel disclosed in the Figures.

Transceiver 16 is any signal conversion device which can convert optically encoded signals into electrically encoded signals, and vice versa. Transceiver 16 is capable of supporting the transmission rates that are defined under the Fibre Channel standard and that are contemplated to be used by the type of devices that are intended to operate on network 18. Current transmission rates that have been defined under Fibre Channel include 1 and 2 Gigabits per second (Gbps) although specifications have been written for 10 Gbps, and thus, the embodiment shown is not intended to be limited by the transmission rate currently used under the Fibre Channel standard. Transceiver 16 may be implemented using model EM212-LP3TA-MB from E2O Communications, Inc. of Calabasas, Calif., rendering transceiver 16 within the category of devices commonly referred to as small form factor pluggable ("SFP") transceivers. Model EM212-LP3TA-MB receives optical serial signals and converts these optical signals into electrical serial signals which are then transmitted via its electrical output. Model EM212-LP3TA-MB also includes an input for receiving electrical serial signals. Upon receiving these electrical signals, model EM212-LP3TA-MB converts these signals into optical encoded serial signals transmits them via its optical I/O connection.

The implementation of transceiver 16 using a SFP transceiver from E2O Communications, Inc. is not intended to be limiting. Other types of SFF transceivers may be used from other manufacturers and can be either pluggable or non-pluggable and may or may not have an LC optical connection. In another embodiment, transceiver 16 may also be implemented using a transceiver that supports the functionality described in this application, such as a gigabit interface converter ("GBIC"), a media interface adapter ("MIA") or equivalent.

I/O connection 6 is implemented using a Fibre Channel compliant connector suitable for connecting to a device configured with a device interface (not shown) that provides Node functionality and that has at least one NL Port, such as Port 36 of storage device 26. For example, I/O connection 6 may be implemented using an SCA2 40 pin connector, available from Molex, Inc. of Lisle, Ill. and having model number 74441-0001. I/O connection 6 should have sufficient conductors for connecting receiver 38 with signal path 10 and for connecting transmitter 40 to signal path 12 as defined by the Fibre Channel standard.

I/O connection 8 is implemented using at least one Versa Modulus Europa ("VME") standards compliant connector, such as the P0, P1 or P2 connectors defined under the VITA/ANSI VME standard, version 1.1. These connectors are available from Molex, having the model number 54603-0952), P1/P2 (HARTING P/N-0201.160.2101), respectively. Using a VME standards compliant connector to implement I/O connection 8 is not intended to limit the current embodiment of the invention. Other types of connectors and may be used, including VME connectors that may be later defined in subsequent versions of the VME standard. For example, the VITA 46 working group has proposed a new VME standard and sometimes referred to as the "VME 2" standard. This VITA 46 compliant connector may be implemented by using the VXS MultiGig RT2 NG (next-generation) connector, available from Tyco Electronics of Harrisburg, Pa., USA.

The term "VME" is a standard defined by a group of documents created by VITA (VME International Trade Association) and ANSI, which define software, electrical (e.g., bus signals, user-defined I/O) and mechanical attributes (e.g., connector design and pin arrangement and module form factor) of devices that are intended to interoperate with other VME standard compliant devices. These group of documents include the following papers (some of which may have been superseded in whole or in part by other documents in the list): IEEE 1014-1987, ANSI/VITA 1-1994, VITA 1.1-1997, VITA 1.3-1997, IEEE 1101.1, VITA 1.5, VITA 4-1997 VITA 4.1-1997, ANSI/VITA 5.1-1994, VITA 6-1994 SCSA, ANSI/VITA 17-1998, ANSI/VITA 10-1995, VITA 12-1996, VITA 18-1997, VITA 26-1998, VITA 31, VITA 31.1, VITA 35-2000, VITA 41 and VITA 27.

Although signal paths 10, 12 and 14 are depicted as single lines of physical media, multiple conductors or media may be used to provide differential signaling characteristics. The multiple conductors or media are not shown to avoid over-complicating the embodiment depicting the invention. When using differential signaling, four pairs of signaling paths are used. For example, at least four pairs of conductors (not shown) are used in I/O connection 6 to transceive differential signals with an attached Node. Two pairs are used to carry differential input signals and another two pairs are used to carry differential output signals. In another example, output 22 and input 24 also may operate using differential signaling.

Using at least one VME compliant connector to implement I/O connection 8 requires that any device that is intended to operate with network 18 through I/O connector 8 should have a connector that is compatible with the VME connector(s) used to implement I/O connection 8. In one example, device 30 includes an enclosure having a VME bus that is connected to a Node having L Port functionality and a number of VME connectors that are of the type necessary for coupling with the VME connectors used to implement I/O connection 8. The signaling pins used on the VME bus and VME connectors to carry signals transmitted between device 30 and I/O connection 8 may be user selectable.

Device 32 is capable of receiving signals from optical I/O connection 20 and re-transmitting signals back to I/O connection 20 if the signals do not represent data intended to be received by device 32. Such a device can be a Fibre Channel standards compliant hub, switch, storage server or mass storage device having an L_Port, such as an NL Port, FL Port or GL Port. In an alternative embodiment (not shown), a fiber optical cable can be used with each end of the cable connected to optical I/O connection 22.

Figure 2:
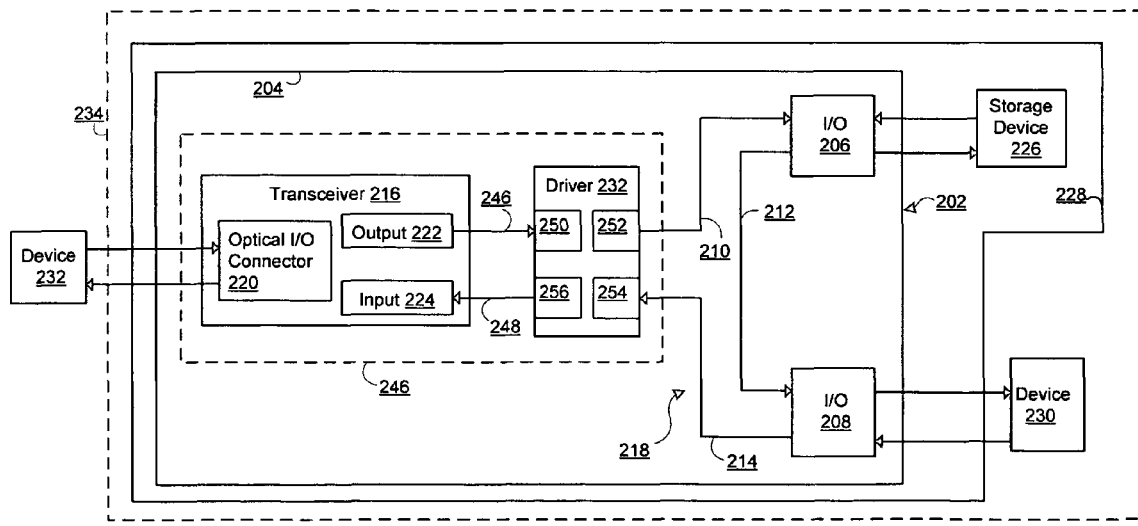
FIG. 2 is a block diagram of a platform, module and system for networking Fibre Channel compliant devices in accordance with a second embodiment of the present invention.

FIG. 2 is a block diagram of a platform, module and system in accordance with another embodiment of the invention. Platform 202 includes a circuit board 404, I/O connections 206 and 208, signal paths 210, 212 and 214, a transceiver 216, and an equalizer and driver circuit (collectively, a "Driver") 244, which form a FC-AL network 218 for connecting devices having Node functionality. Transceiver 216 includes optical I/O connection 220, output 222 and input 224. Circuit board 404, transceiver 216, I/O connection 206, I/O connection 208, and signal paths 210, 212 and 214 have each have a function and structure similar to those previously described for circuit board 4, transceiver 16, I/O connection 6, I/O connection 8 and signal paths, 10, 12 and 14, respectively, in FIG. 1.

Driver 244 improves the quality of signal transmissions that are transmitted by output 222 and received by input 224 through their respective signal paths, such as signal paths 246 and 248, respectively. Driver 244 includes an equalizer-input 250, an equalizer-output 252, a driver-input 254 and a driver-output 256. Driver 244 equalizes signals transmitted along signal paths 246 and 248 by adjusting for attenuation that may occur on these signal paths. For example, if signal paths 246 and 248 are each implemented using a copper coaxial cable, using Driver 244 compensates for attenuation caused by skin-effect losses that typically arise from the use of such physical media. The addition of Driver 244 permits the invention shown to compensate for signal paths that may suffer from these attenuation problems. Driver 244 may be implemented using model MAX3800 from Maxim Integrated Products of Sunnyvale, Calif. ("Maxim"), which can support the equalization of signals having data rates of 3.2 gigabits per second, although the use of this particular device is not intended to limit the present invention in any way and other types of line condition circuits may be used, including those that can control the impedance of a signal path.

The location and number of signal Drivers shown in FIG. 2 are not intended to limit the scope and spirit of the disclosure. Any number of Drivers may be used as needed to mitigate the effect of impedance on signal paths used on network 218. Device 244 provides for differential inputs and outputs, which are not depicted as pairs of inputs or outputs in FIG. 2 to avoid over-complicating this disclosure. The coupling of transceiver 216 and Driver 244 in the manner shown in FIG. 2 creates equalized transceiver assembly 258.

Connecting a device having Node functionality, such as storage device 226, to one of the I/O connections of Platform 201 creates a storage module 228. Storage device 226 includes the same features and structure as described for storage device 26 in FIG. 1. Connecting storage module 228 to additional devices, such as devices 230, 232 or both, creates a storage system 234. Device 230 may be connected to I/O connection 208, while device 232 may be connected to optical I/O connection 220. Devices 230 and 232 may have the same function and structure as described for devices 30 and 32, respectively, in FIG. 1. I/O connections 206 and 208 permit devices 226 and 230 to be connected or disconnected to platform 202. Similarly, optical I/O connection 220 permits device 232 to also be connected to or disconnected from storage platform 202.

Figure 3:
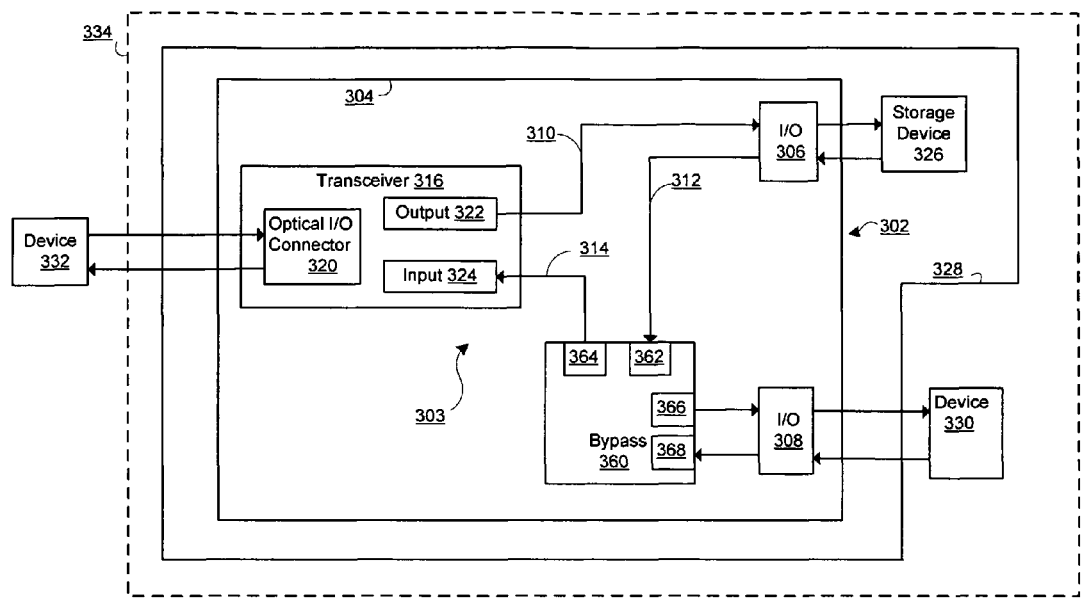
FIG. 3 is a block diagram of a platform, module and system for networking Fibre Channel devices in accordance with a third embodiment of the present invention.

FIG. 3 is block diagram of another implementation of a platform, module and system in accordance with yet another embodiment of the present invention. Platform 302 includes circuit board 304, I/O connections 306 and 308; signal paths 310, 312 and 314; a port bypass circuit ("Bypass") 360 and a transceiver 316, which form a FC-AL network 318 for connecting devices having Node functionality. Transceiver 316 includes optical I/O connection 320, output 322 and input 324. Circuit board 304, transceiver 316, I/O connection 306, I/O connection 308, and signal paths 310, 312 and 314 each have a function and structure similar to those previously described for circuit board 4, transceiver 16, I/O connection 6, I/O connection 8 and signal paths 10, 12 and 14, respectively, in FIG. 1.

Connecting a device having Node functionality to one of the I/O connections of storage platform 302 creates a storage module 328. For example, storage device 326 is shown connected to I/O connection 306, forming storage module 328. The function and structure of storage device 326 are similar to the function and structure of storage device 26 disclosed in FIG. 1 but storage device 326 is depicted in simplified form in FIG. 3 to avoid over-complicating the herein disclosure.

Connecting storage module 328 to additional devices, such as devices 330, 332 or both, creates a storage system 334. Device 330 is shown connected to I/O connection 308, while device 332 is shown connected to optical I/O connection 320. The function and structure of devices 330 and 332 are similar to the function and structure of devices 330 and 332, respectively described above in FIG. 1. I/O connections 306 and 308 permit storage device 326 and device 330 to be connected to or disconnected from platform 302. Similarly, optical I/O connection 320 permits device 332 to also be connected to or disconnected from platform 302.

Bypass 360 includes an input 362, output 364, a bypass-output 366 and bypass-input 368 and operates under one of two modes. When configured in a "bypass" mode, Bypass 360 permits I/O connection 308 and any a Node that is directly or ultimately attached to it, such as device 330, to be bypassed or electrically decoupled from FC-AL network 318, while enabling signals received at input 362 to be routed to output 364. This bypass function permits a Link comprised of signal path 312 and 314, and hence FC-AL network 318, to remain intact since any signals or data received by Bypass 360 at input 3362 will be transmitted along signal path 314 from output 364. In an alternative embodiment and while in the bypass mode, Bypass 360 may also preclude the routing of any signals received from bypass-input 368 to output 364.

When configured in a "normal" mode, Bypass 360 electronically couples device 330 to signal paths 312 and 314 by routing signals received at input 362 to bypass-output 366, and routing signals received at bypass-input 368 to output 364. If device 330 is operating as designed, the electronic coupling of device 330 permits it to receive and transmit signals on FC-AL network 318. Thus, Bypass 360 may be configured under these two modes to switch between input 362 or bypass-input 368 from which signals or data may be sourced for transmission on signal path 314, and hence FC-AL network 318, via output 364.

Bypass 360 may be implemented using a Fibre Channel port bypass circuit ("PBC") having model number 3750, also available from Maxim. PBC Model 3750 supports Fibre Channel transmission rates of 2.0125 Gbps but other types of PBCs may be used that have different transmission rates, such PBC having model number 3751, also available from Maxim Integrated Products. Using Maxim model number 3750 to implement Bypass 360 requires asserting signals on selected pins (not shown) on Bypass 360 to configure Bypass 360 to operate from either of the two modes described above.

Asserting signals on selected pins to configure the mode of operation of Bypass 360 is not intended to limit the scope of the embodiment shown. Other types of PBCs may be used to implement the bypass features described for Bypass 360, including any that offer automatic bypassing or routing, sometimes referred to as "hot swapping". For example, these types of PBCs enable platform 302 to keep intact the Link defined by signal path 312 and 314 if Bypass 360 detects that platform 302 is not physically coupled or connected to device 330 or that device 330 is powered down or no longer operating as designed. Keeping the Link defined by signal paths 312 and 314 intact enables a Node, such as device 332, to communicate with another Node that is be coupled to platform 302, such as storage device 326, even though device 330 is not longer connected to storage platform 302 via I/O connection 308.

Figure 4:
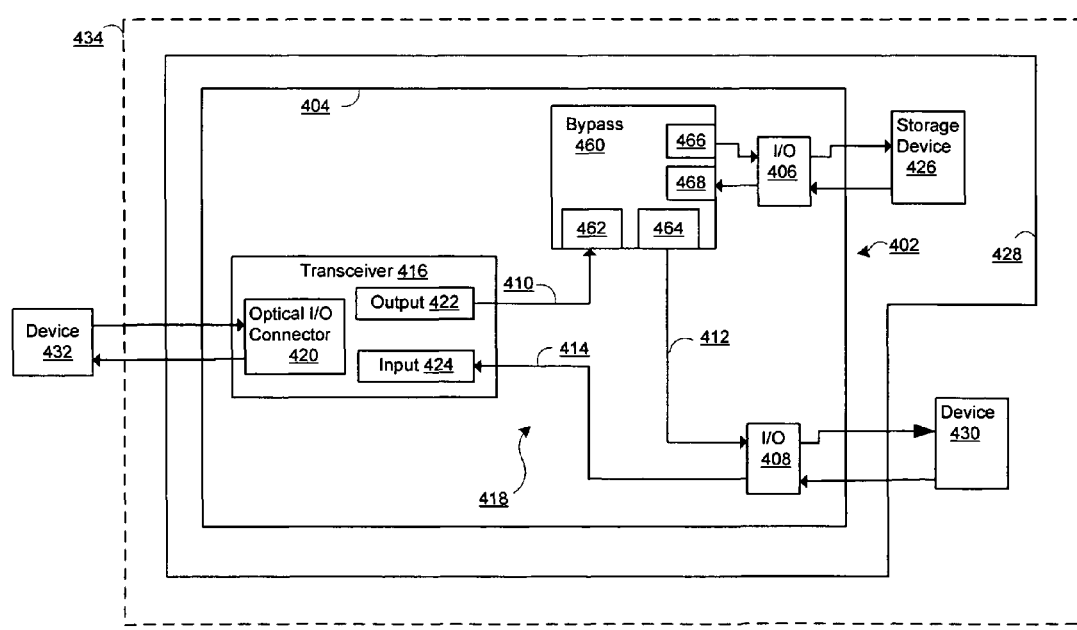
FIG. 4 is a block diagram of a platform, module and system for networking Fibre Channel devices in accordance with a fourth embodiment of the present invention.

Bypass 360 supports differential signaling but is not shown with differential inputs and outputs to avoid overcomplicating the herein disclosure. In addition, the location and placement of Bypass 360 on network 318 is not intended to limit the embodiment shown in FIG. 3. For example, as shown in FIG. 4, a platform 402 may include a Bypass 460 that is placed at a location on FC-AL network 418 so that a Node, such as storage device 426, connected to I/O connection 406 may be electronically coupled or decoupled to the Link defined by signal paths 410 and 412. Bypass 460 includes an input 462, output 464, a bypass-output 466 and bypass-input 468. Bypass 460, input 462, output 464, bypass-output 466 and bypass-input 468 each have a function and structure similar to those respectively described in FIG. 3 for Bypass 360, input 362, output 364, bypass-output 366 and bypass-input 368.

Figure 5:
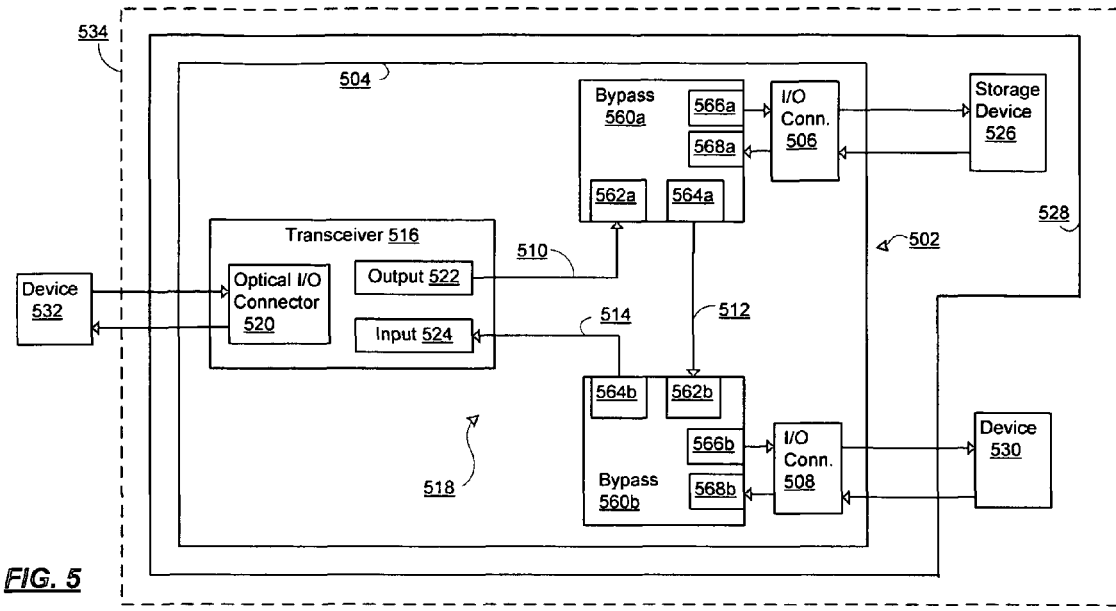
FIG. 5 is a block diagram of a platform, module and system for networking Fibre Channel devices in accordance with a fifth embodiment of the present invention.

FIG. 5 illustrates in block diagram form an example of a platform 502 that includes more than one instance of a Bypass for electronically coupling or decoupling more than one I/O connection, such as I/O connections 506 and 508, to or from FC-AL network 518 in any combination. FC-AL network 518 includes I/O connections 506 and 508, signal paths 510, 512 and 514, transceiver 516, Bypass 560a and Bypass 560b. Bypass 560a is coupled to I/O connection 506, and Bypass 560b is coupled to I/O connection 508 by the signal paths shown, which are not numbered to avoid overcomplicating the herein disclosure. Bypass 560a and Bypass 560b respectively provide port bypass circuit functionality for I/O connections 506 and 508 and any Nodes that may be connected to these I/O connections, such as storage device 526 and device 530. Bypass 560a and Bypass 560b each have a function and structure that are respectively similar to those described in FIG. 4 for Bypass 460 and in FIG. 3 for Bypass 360. Transceiver 516 includes optical I/O connection 520, output 522 and input 524. Circuit board 504, transceiver 516, I/O connection 506, I/O connection 508, and signal paths 510, 512 and 514 each have a function and structure similar to circuit board 4, transceiver 16, I/O connection 6, I/O connection 8 and signal paths 10, 12 and 14, respectively, as described in FIG. 1.

Bypass 560a includes an input 562a, output 564a, a bypass-output 566a and bypass-input 568a, while Bypass 560b includes an input 562b, output 564b, a bypass-output 566b and bypass-input 568b. Bypass 560a and 560b each function as an electronic switch that permits I/O connections 506 and 508, respectively, and any Node that is directly or ultimately attached to them, such as devices 526 and 530, respectively, to be electronically coupled to or electronically decoupled from FC-AL network 518 in any combination. As previously described, the electronic coupling or decoupling of I/O connections using a Bypass, such as Bypass 560a and Bypass 560b, permits Nodes attached to the I/O connections to either be part of the FC-AL network or be bypassed from the FC-AL network while keeping the links attached to the Nodes intact.

For example, storage module 528 may be created by configuring Bypass 560a to electronically couple FC-AL network 518 to a storage device having Node functionality, such as storage device 526. The function and structure of storage device 526 are similar to the function and structure of storage device 26 disclosed in FIG. 1 but storage device 522 is depicted in simplified form to avoid over-complicating the herein disclosure. In another example, a storage system 534 may be created by attaching storage module 528 to device 530 via I/O connector 508 and electronically configuring Bypass 560b to electronically couple device 530 to FC-AL network 518 using the Link defined by signal paths 512 and 514. Storage module 528 may also be connected to device 532, as shown. Device 530 is shown connected to I/O connection 508, while device 532 is shown connected to optical I/O connection 520. The function and structure of devices 530 and 532 are similar to the function and structure of devices 30 and 32, respectively described above in FIG. 1. I/O connections 506 and 508 respectively permit devices 526 and 530 to be physically connected to or disconnected from storage platform 502. Similarly, optical I/O connection 520 permits device 532 to also be physically connected to or disconnected from storage platform 502.

Platform 502 may be further modified by coupling a Driver (not shown) to transceiver 516, Bypass 560a and Bypass 560b, creating an equalized transceiver assembly comprised of transceiver 516 and the Driver. The Driver and equalized transceiver assembly each have the same function and structure similar to those respectively described in FIG. 2 for Driver 244 and equalized transceiver assembly 258.

Figure 6:
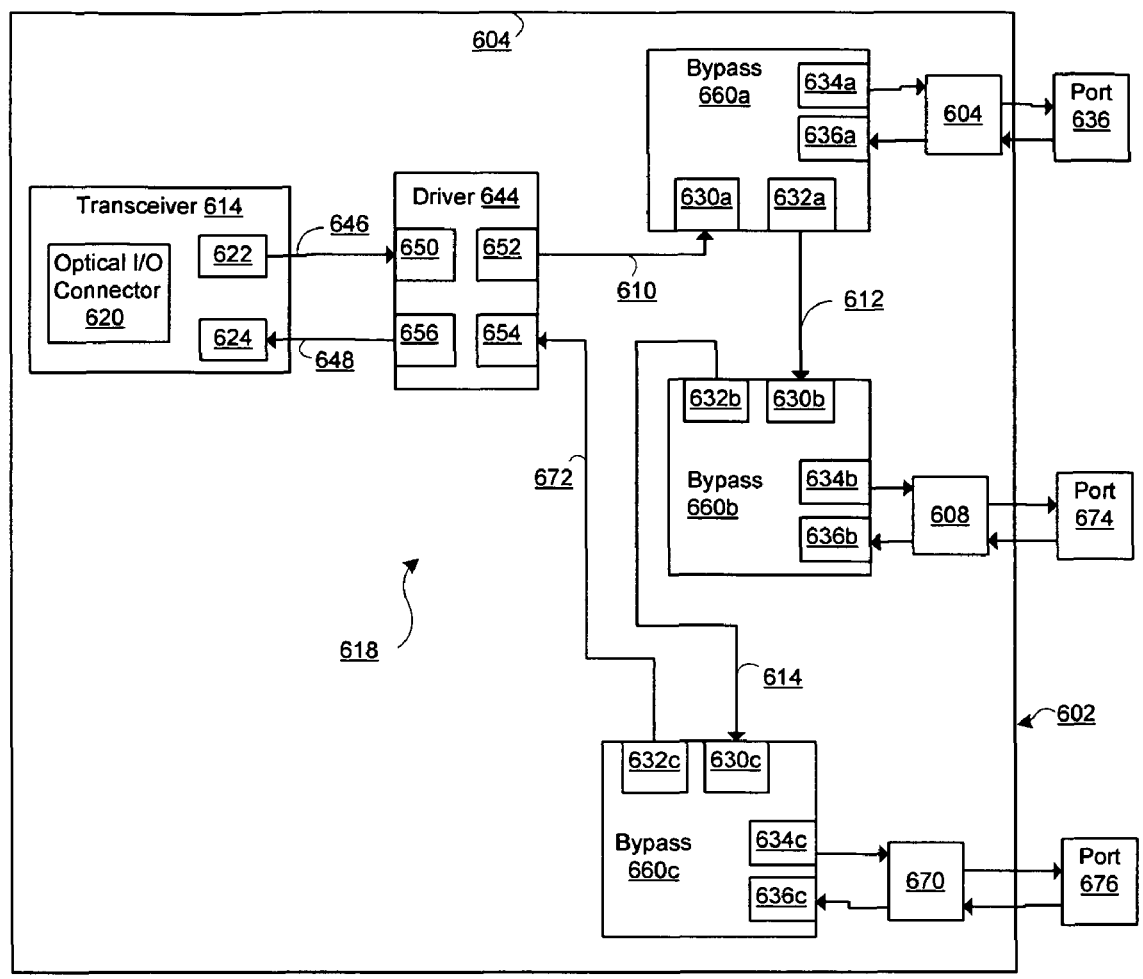
FIG. 6 is a block diagram of a platform having more than one instance of a bypass circuit for electronically coupling to or electronically decoupling from a FC-AL network more than one I/O connection in accordance with a sixth embodiment of the present invention.

FIG. 6 is a block diagram of a platform 602 having more than one instance of a Bypass for electronically coupling to or electronically decoupling from FC-AL network 618 more than one I/O connection in any combination. Platform 602 includes a circuit board 604, I/O connections 606, 608 and 670, a transceiver 616, a Driver 644, Bypass 660a, Bypass 660b, Bypass 660c and signal paths 610, 612, 614, 646, 648 and 672. Bypasses 660a, 660b and 660c are each respectively coupled to I/O connections 606, 608 and 670 by the signal paths shown. These signals paths are not numbered in FIG. 6 to avoid overcomplicating the herein disclosure. Bypass 660a, Bypass 660b and Bypass 660c respectively provide port bypass circuit functionality for I/O connections 606, 608 and 670 and any Nodes (not shown) that may be connected to these I/O connections. Circuit board 604, transceiver 616, Driver 644, the signal paths and Bypasses 660a, 660b and 660c each have a function and structure that are similar to those previously described above. I/O connections 606 and 608 each have a function and structure similar to I/O connection 6, while I/O connection 670 has a function and structure similar to I/O connection 8.

Bypass 660a includes an input 662a, output 664a, a bypass-output 666a and bypass-input 668a. Similarly, Bypass 660b includes an input 662b, output 664b, a bypass-output 666b and bypass-input 668b, and Bypass 660c includes an input 662c, output 664c, a bypass-output 666c and bypass-input 668c. Bypass 660a, Bypass 660b and Bypass 660c each function as an electronic switch that permits I/O connections 606, 608 and 670, respectively, and any a Node that is directly or ultimately attached to them to be electronically coupled to or electronically decoupled from network FC-AL 618 in any combination. The signal paths electrically coupling I/O connections 606, 608 and 670 to their respective Bypass circuits are not shown to avoid overcomplicating the herein disclosure.

Platform 602 also includes a transceiver 616, which has an optical I/O connection 620, output 622 and input 624. Driver 644 includes an input 650, which is coupled to output 622 by signal path 646, an equalized-output 652 coupled to signal path 610, an equalized-input 654 coupled to signal path 672 and an output 656 coupled to input 624 by signal path 648. The use of Driver 644 in platform 602 is not intended to limit the invention in any way and may be omitted if signal paths 646 and 648 are implemented having a line impedance characteristic that is within the design tolerances of the type of transceiver 616 used. In addition, one of ordinary skill in the art would recognize after perusing the disclosure herein that more than one instance of Driver 644 may also be used to mitigate or manage the effect of impedance on signal paths used on network 618.

The use of more than two Bypasses, such as Bypasses 660a, 660b, and 660c, on FC-AL network 618 discloses an example in which Bypasses may be added to platform 602 to increase the number or types of I/O connections, such as I/O connections 606, 608 and 670, that would be available for connecting to Nodes through their respective Fibre channel ports. In addition, Bypass 660a, Bypass 660b and Bypass 660c electronically couple or de-couple Ports 636, 674 and 676, respectively, from FC-AL network 618 in any combination.

Figure 7:
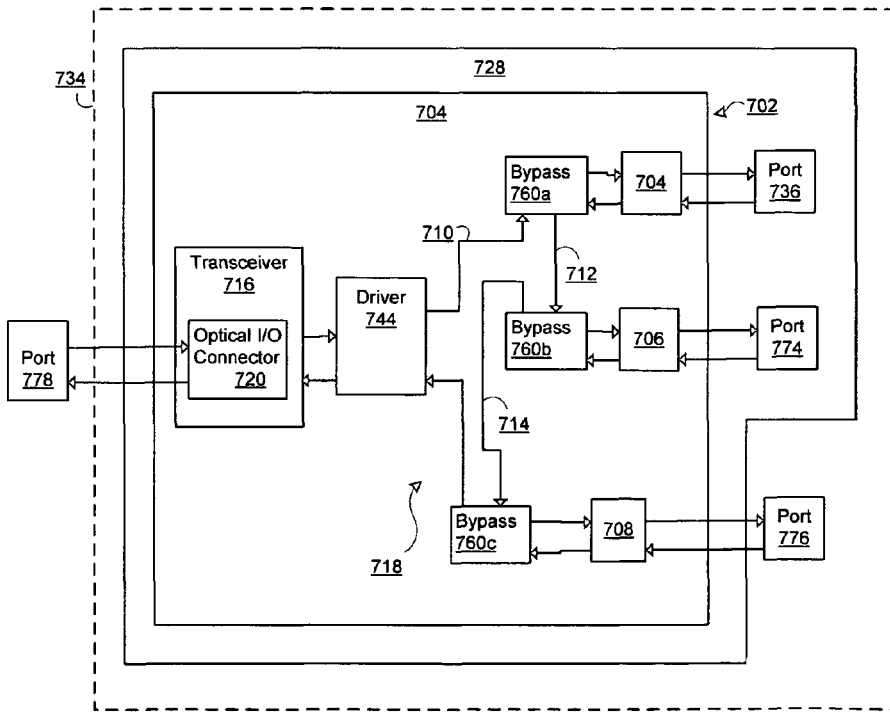
FIG. 7 is a block diagram of a platform, module and system for networking Fibre Channel devices in accordance with a seventh embodiment of the present invention.

For example, referring to FIG. 7, storage module 728 may be formed by attaching at least one storage device (not shown) having at least one Port to an available I/O connection provided by a platform 702. Platform 702 has a function and structure similar to platform 602, which has been previously described in detail, and thus, the components comprising platform 702 have been depicted in FIG. 7 in simplified form. Platform 702 is shown having a circuit board 704, driver 744, a transceiver 716 having at least one optical I/O connector 720, Bypass 760a, Bypass 760b and Bypass 760c, which each have a structure and function similar to their counterparts as described above with reference to FIG. 6, respectively.

To form storage module 728, Port 736 and Port 774 are respectively coupled to Bypass 760a and Bypass 760b through I/O connections 706 and 708, as shown. Bypass 760a and Bypass 760b are also configured to electronically couple Port 736 and Port 774, respectively, to FC-AL network 718. When electronically coupled to FC-AL network 718, Port 736 can receive and send signals using signal paths 710 and 712, respectively, while Port 728 can receive and send signals using signal paths 712 and 714, respectively.

Ports 736 and 774 may be implemented using a single Fibre Channel compliant storage device that has at least two Ports or two storage devices that each has at least a single Port that may be connected respectively to Bypasses 760a and 760b. Except for their respective Ports, the storage devices are not depicted to avoid overcomplicating the herein discussion. Coupling another device (not shown) having Fibre Channel functionality to optical I/O connection 716 using the device's Port 728 forms storage system 734. The device providing Port 728 may have a function and structure similar to that described for device 32, previously described above in FIG. 1.

Figure 8:
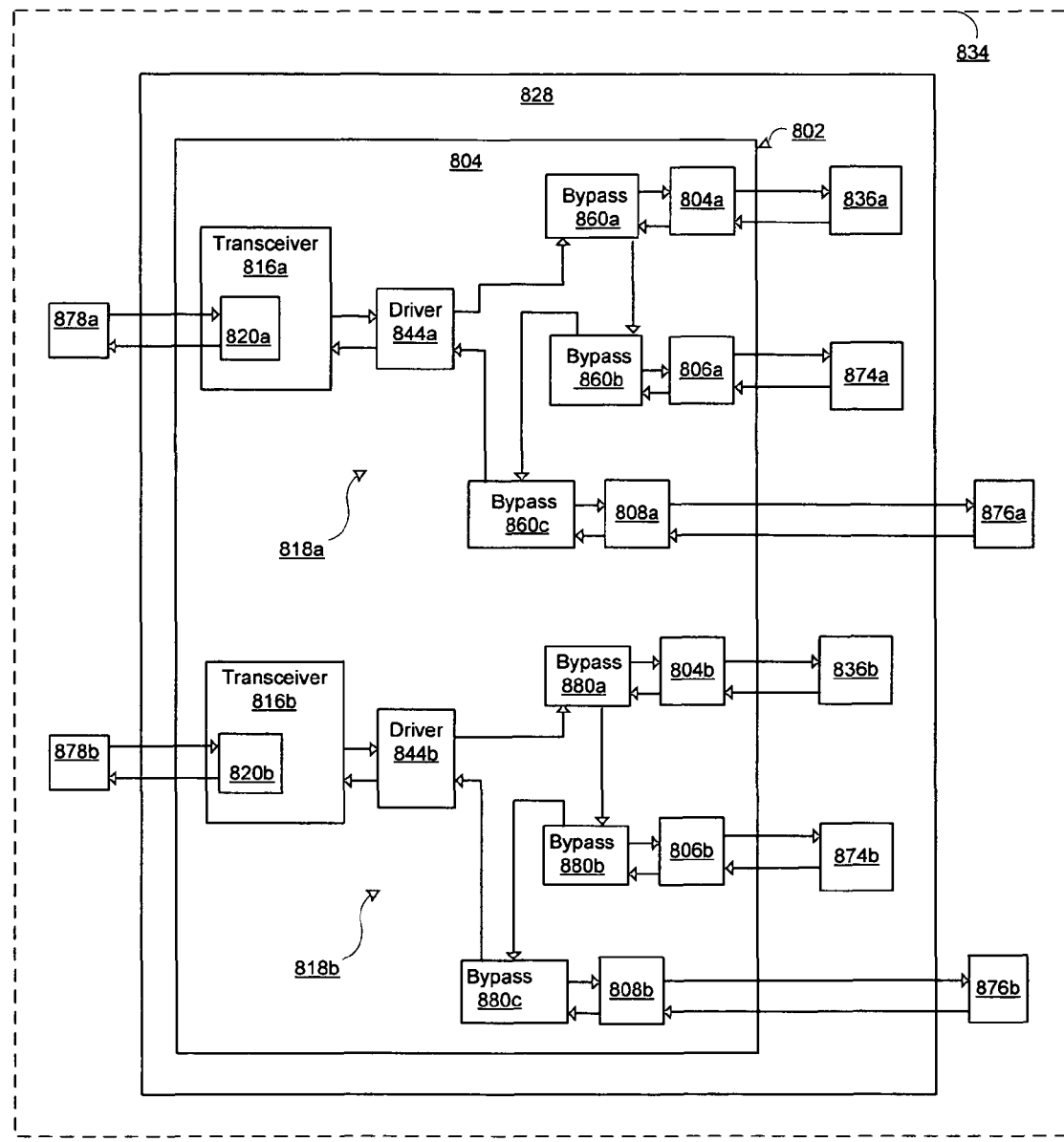
FIG. 8 is a block diagram of a platform, module and system for networking Fibre Channel devices in accordance with an eighth embodiment of the present invention.

FIG. 8 is a schematic block diagram of a platform 802 having at least two FC-AL networks 818a and 818b in accordance with yet another further embodiment of the present invention. FIG. 8 also depicts a storage module 828 and system 834 coupled to platform 802. The function and structure of networks 818a and 818b are individually similar to that of network 618 disclosed in FIG. 6 and thus, the elements of networks 818a and 818b are presented in FIG. 8 in simplified form. Network 818a is shown formed on circuit board 804 and includes a Driver 844a, a transceiver 816a, Bypass 860a, Bypass 860b, Bypass 860c and I/O connections 804a, 806a and 808a. Network 818b is shown formed on circuit board 804 and includes a Driver 844b, a transceiver 816b, Bypass 880a, Bypass 880b, Bypass 880c and I/O connections 804b, 806b and 808b. The Bypasses used on Networks 818a and 818b electronically couple or de-couple the Ports that are respectively connected to the Bypasses in any combination.

Using two FC-AL networks, such as network 818a and 818b, provides a platform configuration that offers more than one network, providing redundancy and greater potential bandwidth capacity. For example, if two dual-ported storage devices are added to platform 802, a storage module 828 is formed having redundant network paths and double the network bandwidth that would be available to the attached storage devices. To form storage module 828, Port 836a and Port 874a are respectively coupled to Bypass 860a and Bypass 860b using I/O connections 804a and 806a, as shown. In addition, Port 836b and Port 874b are respectively coupled to Bypass 880a and Bypass 880b. Ports 836a and 874a are implemented using a single storage device that has at least two Ports, while Ports 836b and 874b may be implemented using another storage device that also has at least two Ports. A storage device having two Ports is commonly referred to as a dual-ported storage device. A dual-ported storage device having two Fibre Channel ports and using non-volatile memory as mass storage may be used and is available from BiTMICRO Networks, Inc. of Fremont Calif.

In an alternative configuration, Ports 874a and 874b are provided by using a dual-ported storage device, while Ports 836a and 836b are provided by using another dual-ported storage device. This alternative configuration provides the best approach for redundancy because if either network 818a or 818b fails, the other network may still be used to access both storage devices using their respective Ports that are coupled to the network still in operation. In addition, the second alternative configuration also provides greater potential bandwidth capacity since FC-AL network 818a and FC-AL network 818b are each available to transceive data to each Port of a dual-ported storage device. Except for their Ports, the storage devices discussed with reference to FIG. 8 are not depicted to avoid overcomplicating the herein discussion.

To extend the redundancy feature offered by platform 802, Ports 876a and 876b may be provided by a device having Fibre Channel functionality. For example, if I/O connectors 808a and 808b have the function and structure similar to those described for I/O connector 8, Ports 876a and 876b may be provided by a device (not shown) having its two ports coupled to a VME backplane bus that provides at least one VME connector that can couple to both I/O connectors 808a and 808b. Coupling Ports 876a and 876b to storage module 828 forms a storage system 834.

In addition, since platform 802 offers two optical I/O connections 820a and 820b, redundancy may be further provided by coupling optical I/O connections 820a and 820b to a single device (not shown) having two Fibre Channel-enabled optical I/O Ports, such as Ports 878a and 878b. Using the same device to provide redundant ports, such as Ports 878a and 878b, such as a multi-ported optical Fibre Channel switch (not shown), is not intended to limit the present invention in any way.

Figure 9A:
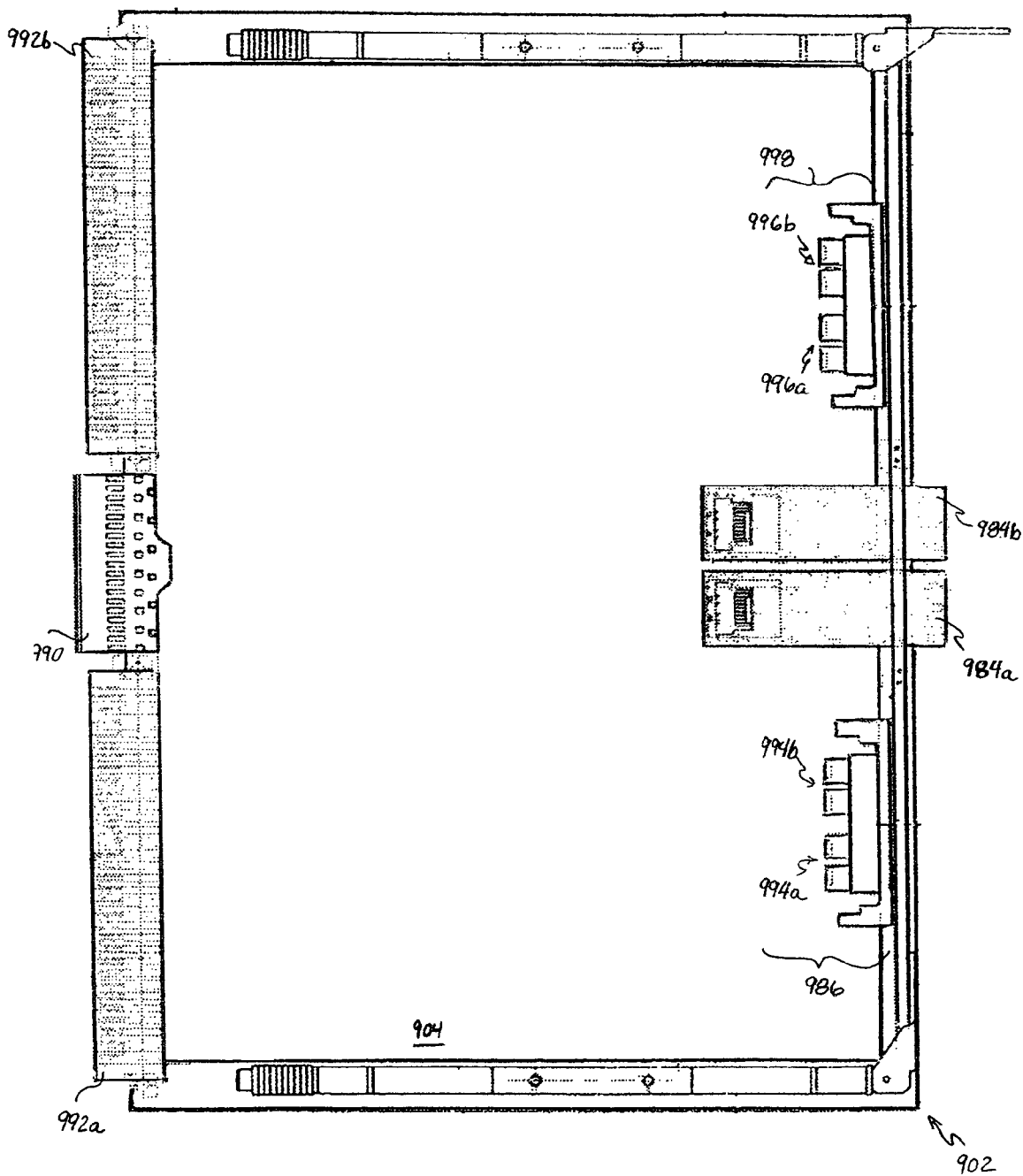
FIG. 9A is a top view illustration of a platform for networking Fibre Channel devices in accordance with a ninth embodiment of the present invention.
Figure 9B:
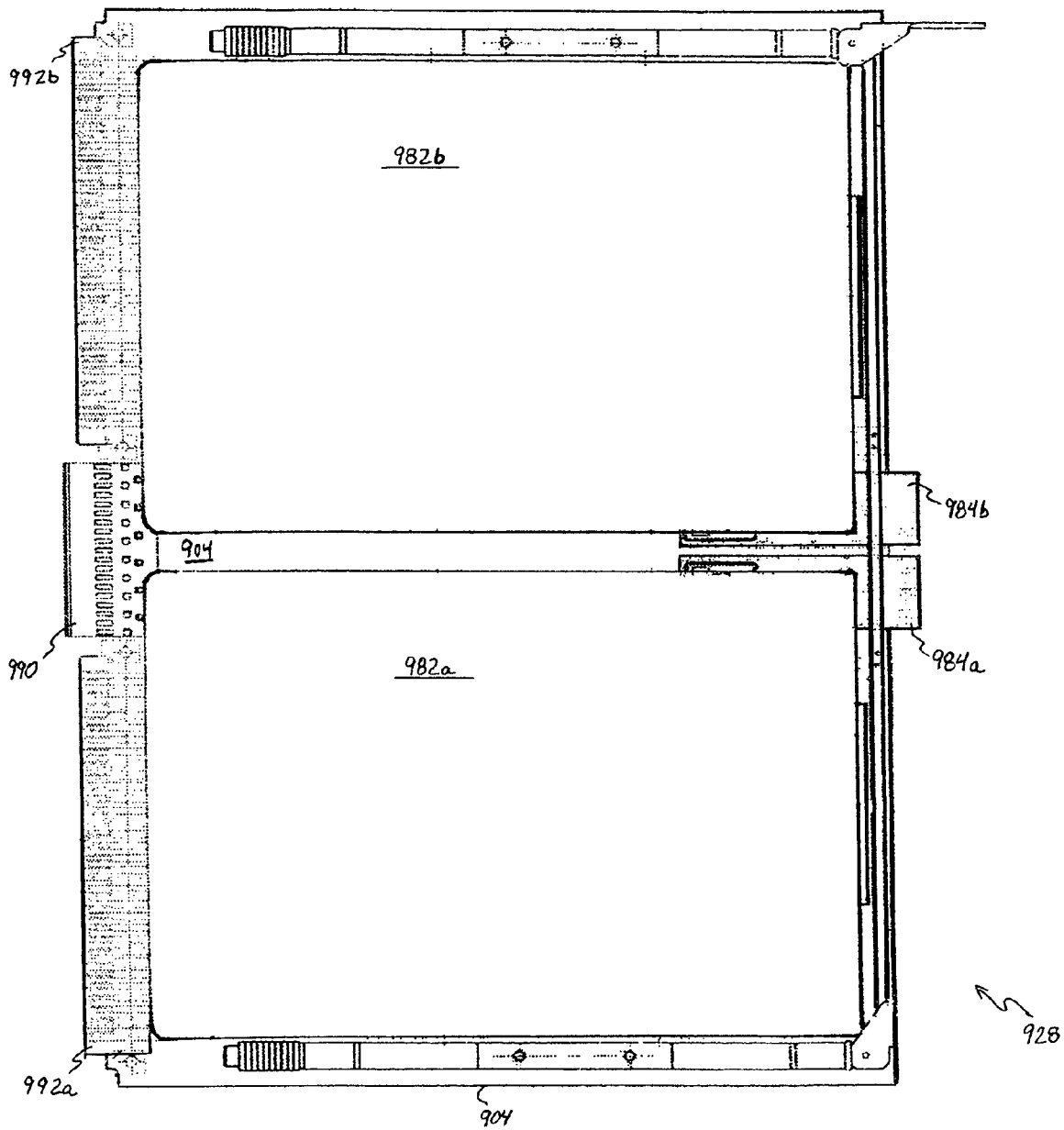
FIGS. 9B and 9C are top and side view illustrations, respectively, of a storage module formed when attaching two Fibre Channel compliant storage devices, which each have a HDD form factor and two Ports, to the platform depicted in FIG. 9A, in accordance with yet another embodiment of the present invention.
Figure 9C:
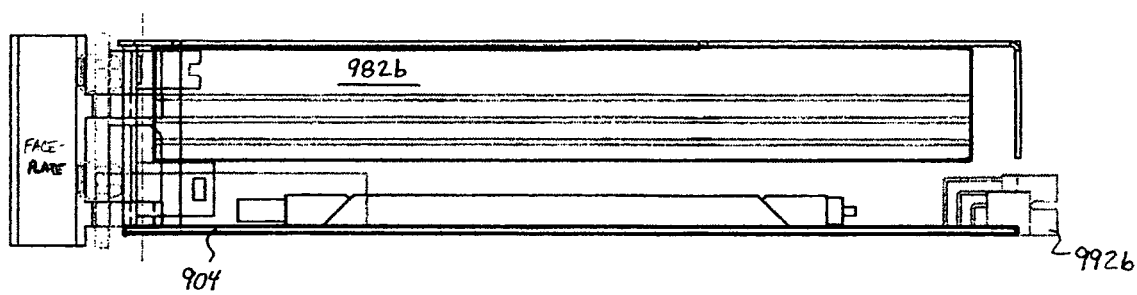

FIG. 9A is a top view illustration of a platform 902 having two FC-AL networks for connecting devices having Fibre Channel Node functionality in accordance with yet an additional embodiment of the present invention. FIGS. 9B and 9C are top and side view illustrations, respectively, of a storage module 928 formed by the attachment to platform 902 of two Fibre Channel compliant storage devices 982a and 982b that each have a HDD form factor and two Ports (i.e., each storage device is a dual port storage device).

In the embodiment shown, platform 902 is implemented in a 6U VME form factor and includes two FC-AL networks that have substantially the same function and structure described for networks 818a and 818b above. The two FC-AL networks are not fully depicted but are formed on circuit board 904 and include cages 984a and 984b, SCA connectors 986 and 988, VME P0 connector 990, VME P1 connector 992a and VME P2 connector 992b.

Cages 984a and 984b are each designed to receive and mate, respectively, to a SFP optical transceiver (not shown), providing each of the FC-AL networks with a transceiver having a structure and function similar to those described for transceiver 816a or 816b described above. The term "cage" is intended to be interpreted widely and includes any enclosure that can electrically couple to a SFP optical transceiver. A typical cage includes an opening at one end to permit the insertion and removal of a SFP optical transceiver and a connector placed at the opposite end of the cage to permit an electrical connection to be made with the electrical input and output pins of the SFP optical transceiver and a set of electrically conductive signal paths. When an SFP optical transceiver is each inserted in cages 984a and 984b, they become part of their respective FC-AL network formed on circuit board 904.

SCA 40-pin connectors 986 and 988 each provide a pair of I/O connections. Connector 986 provides I/O connections 994a and 994b, while connector 988 provides I/O connections 996a and 996b. For each SCA 40-pin connector used, it is intended that one of the I/O connections is used to permit a Port to be coupled to one of the FC-AL networks provided by Platform 902, while the other I/O connection is used to permit another Port to be coupled to the other FC-Al network. Since these I/O connections are from the same SCA 40-pin connector, the two Ports are provided by the same device, such as dual-ported mass storage device 982a or 982b. For example, referring to FIGS. 9B and 9C, the Ports (not shown) of dual-ported storage device 982a are respectively coupled to I/O connectors 994a and 994b. Similarly, the Ports (not shown) of dual-ported storage device 982b are respectively coupled to I/O connections 996a and 996b of connector 988. The Ports provided by each storage device are not shown to avoid overcomplicating the herein disclosure. Coupling a mass storage to platform 902 creates a storage module 928.

As previously described with reference to FIG. 8 above, using a dual-ported storage device provides an optimal approach for redundancy because if either FC-AL network fails, the other network may still be used to access by the storage device using its respective Port that is coupled to the network still in operation. In addition, this embodiment also provides greater potential bandwidth capacity since the FC-AL networks provided on Platform 902 are each available to transceive data to each Port of the dual-ported storage device.

The SCA2 40-pin connector selected should be able to support the requirements required under the Fibre Channel standard and have a sufficient number of conductors to allow for two I/O connections (not shown) to be provided per SCA2 40 pin connector, which are available from Molex. I/O connections 994a, 994b, 996a and 996b have has substantially the same functionality of I/O connections 836a, 836b, 874a and 874b, respectively, and thus, connectors 986 and 988 can each support coupling with a Fibre Channel compliant device that has two Ports.

Coupling each Port of a dual-ported storage device on different networks provides a redundant network path to each storage device. Should one of the FC-AL networks fail, the other network remains available to send or receive Fibre Channel packets from each storage device through the Port that is coupled to the operating FC-AL network. Coupling the Ports of a dual-ported storage on different FC-AL networks also has the added advantage of providing two concurrent network paths to each storage device. For a storage device that can queue or process data from both of its Ports simultaneously, having two functional FC-AL networks operating concurrently can thus enhance the efficiency and performance of such a storage device.

Platform 902 also includes two additional I/O connections in the form of VME connectors. The first I/O connection is implemented in the form of a VME P0 connector 990, while the second I/O connection is implemented in the form of either a VME P1 connector 992a or a VME P2 connector 992b. The first I/O connection is coupled to the first FC-AL network provided by platform 902 and the second I/O connection is coupled to the other FC-AL network.

Each I/O connection disclosed herein with reference FIGS. 9A-9C may also be coupled to a Bypass (not shown), which in turn is connected to a FC-AL network. For example, two Bypasses may be respectively coupled to connector 986 through I/O connections 994a and 994b. The Bypasses are coupled to different FC-AL networks, coupling storage device 982a to different FC-AL networks through the storage device's Ports. One Port of storage device 870a is coupled to one FC-AL network provided by platform 902 through the first Bypass, while the other Port of storage device 982a is coupled to the other FC-AL network through the second Bypass. The Bypasses used in this example are contemplated to have a similar structure and function of those previously described above.

The VME connectors are placed at the edge of circuit board 904 to permit the VME 6U form factor of platform 902 to be plugged into a VME chassis that has a VME backplane which has VME connectors that are suitable for coupling with the VME connectors 990, 992*a* and 992*b*. It is contemplated that VME backplane includes a bus to which a Fibre Channel-enabled device is connected. Since two I/O connections are provided on separate FC-AL networks, a redundant network path is thus provided to the device.

The VME chassis, VME backplane and connectors, and the device connected to the VME bus are not shown to avoid overcomplicating the invention herein. In addition, the arrangement and type of VME connectors used to implement the I/O connections are not intended to limit the scope and spirit of claimed invention as taught by the embodiment shown in FIG. 9.

What is claimed is:

1. A platform for networking Fibre Channel compliant devices, comprising:
   a circuit board having a first set of signal paths;
   a first transceiver having a first optical I/O port, a first transceiver output and a first transceiver input;
   a first I/O connection for coupling to a first Fibre Channel port and for receiving signals transmitted by said first transceiver output via a subset of said first set of signal paths, said first I/O connection disposed to couple directly with a Fibre Channel compliant device external to the platform; and
   a second I/O connection for coupling to a second Fibre Channel port and for receiving signals from said first Fibre Channel Port, said second I/O connection disposed to couple directly with another Fibre Channel compliant device external to the platform.

2. The platform in claim 1, wherein said first and second I/O connections are attached to said circuit board.

3. The platform in claim 1, further including:
   a second transceiver having a second optical I/O port, a second transceiver output and a second transceiver input; and
   a third I/O connection for coupling to a third Fibre Channel port and for receiving signals transmitted by said second transceiver output via a subset of said second set of signal paths.

4. The platform in claim 1, further including a fourth I/O connection for coupling to said VME bus.

5. The platform in claim 4, further including a first bypass coupled to said driver and second I/O connection.

6. The platform in claim 1, further including a first driver coupled to said first transceiver and said first I/O connection.

7. The platform in claim 6, further including a second bypass coupled to said driver and said first I/O connection.

8. A platform for networking Fibre Channel compliant devices, comprising:
   a circuit board having a first set of signal paths;
   a first transceiver having a first optical I/O port, a first transceiver output and a first transceiver input;
   a first I/O connection for coupling to a first Fibre Channel port and for receiving signals transmitted by said first transceiver output via a subset of said first set of signal paths;
   a second I/O connection for coupling to a second Fibre Channel port and for receiving signals from said first Fibre Channel Port; and
   wherein said first I/O connection includes a SCA2 40 pin connector suitable for coupling to said first Fibre Channel port and said second I/O connection includes a VME connector suitable for coupling to a VME bus having conductors coupled to said second Fibre Channel port.

9. A platform for networking Fibre Channel compliant devices, comprising:
   a circuit board having a first set of signal paths;
   a first transceiver having a first optical I/O port, a first transceiver output and a first transceiver input;
   a first I/O connection for coupling to a first Fibre Channel port and for receiving signals transmitted by said first transceiver output via a subset of said first set of signal paths;
   a second I/O connection for coupling to a second Fibre Channel port and for receiving signals from said first Fibre Channel port; and
   a first bypass coupled to a driver and said second I/O connection.

10. The platform in claim 9, further including a third I/O connection for coupling to a third Fibre Channel port and for receiving signals from said second Fibre Channel port.

11. The platform in claim 10, wherein said first, second and third I/O connections are attached to said circuit board.

12. The platform in claim 10, further including:
    a second transceiver having a second optical I/O port, a second transceiver output and a second transceiver input; and
    a fourth I/O connection for coupling to a fourth Fibre Channel port and for receiving signals transmitted by said second transceiver output via a subset of said second set of signal paths.

13. The platform in claim 12, further including a fifth I/O connection for coupling to a fifth Fibre Channel port and for receiving signals from said fourth Fibre Channel port.

14. The platform in claim 12, further including a sixth I/O connection for coupling to a sixth Fibre Channel port and for receiving signals from said fourth Fibre Channel port.

15. The platform in claim 9, further including a second bypass coupled to said driver and said first I/O connection.

16. The platform in claim 15, wherein said first I/O connection includes a Fibre Channel compliant connector and said second I/O connection includes at least one VME standards compliant connector.

17. A storage module, comprising:
    a platform having a circuit board having a first set of signal paths;
    a first transceiver having a first optical I/O port, a first transceiver output and a first transceiver input;
    a first I/O connection for coupling to a first Fibre Channel port and for receiving signals transmitted by said first transceiver output via a subset of said first set of signal paths; and
    a second I/O connection for coupling to a second Fibre Channel port and for receiving signals from said first Fibre Channel Port;
    a mass storage device attached to said first I/O connection and having said first Fibre Channel port; and
    wherein the storage module has a form factor suitable for use in a 6U VME enclosure having a VME bus.

18. The storage module in claim 17, wherein said first and second I/O connections are attached to said circuit board.

19. The storage module in claim 18, wherein said first I/O connection includes a SCA2 40 pin connector suitable for coupling to said first Fibre Channel port and said second I/O connection includes a VME connector suitable for coupling to said VME bus.

20. The storage module in claim 17, further including:
    a second transceiver having a second optical I/O port, a second transceiver output and a second transceiver input; and a third I/O connection for coupling to a third Fibre Channel port and for receiving signals transmitted by said second transceiver output via a subset of said second set of signal paths.

21. The storage module in claim 20, further including a fourth I/O connection for coupling to said VME bus.

22. A storage system, comprising:
a storage module coupled to a VME bus contained within an enclosure and capable of carrying signals from a first device having Fibre Channel node functionality and to a second device having Fibre Channel node functionality, said storage module including:
a platform having a circuit board having a first set of signal paths;
a first transceiver having a first optical I/O port, a first transceiver output and a first transceiver input;
a first I/O connection for coupling to a first Fibre Channel port and for receiving signals transmitted by said first transceiver output via a subset of said first set of signal paths; and
a second I/O connection for coupling to a second Fibre Channel port and for receiving signals from said first Fibre Channel Port; and
a mass storage device attached to said first I/O connection and having said first Fibre Channel port.

23. The storage system in claim 22, wherein said first and second I/O connections are attached to said circuit board and said mass storage device has a HDD form factor.

24. The storage module in claim 22, wherein said first I/O connection includes a SCA2 40 pin connector suitable for coupling to said first Fibre Channel port and said second I/O connection includes a VME connector suitable for coupling to said VME bus.

25. The storage module in claim 22, further including:
a second transceiver having a second optical I/O port, a second transceiver output and a second transceiver input; and
a third I/O connection for coupling to a third Fibre Channel port and for receiving signals transmitted by said second transceiver output via a subset of said second set of signal paths.

26. The storage module in claim 25, further including a fourth I/O connection for coupling to said VME bus.

27. A platform for a integrating a mass storage device with another device, comprising:
a means for transceiving having a means for inputting and outputting optical signals, an output and an input;
a first means for inputting and outputting signals having a first means for conducting a signal, said first means for conducting having a connection to said output, said first means for inputting and outputting signals disposed to couple directly with a device external to the platform; and
a first means for bypassing having a second means for conducting signals, said second means for conducting having a connection to said first means for inputting and outputting signals and to a third means for conducting a signal, said third means for conducting a signal having a connection to said input.

28. The platform in claim 27, wherein said first means for conducting includes a means for driving signals.

29. The platform in claim 27, wherein said third means for conducting includes a means for driving signals.

30. A platform for a integrating a mass storage device with another device, comprising:
a means for transceiving having a means for inputting and outputting optical signals, an output and an input;
a first means for inputting and outputting signals having a first means for conducting a signal, said first means for conducting having a connection to said output;
a first means for bypassing having a second means for conducting signals, said second means for conducting having a connection to said first means for inputting and outputting signals and to a third means for conducting a signal, said third means for conducting a signal having a connection to said input; and
a second means for inputting and outputting signals having a connection to said first means for bypassing.

31. The platform in claim 30, wherein said second means for inputting and outputting signals is a VME standards compliant connector.

32. The platform in claim 30, wherein said second means for inputting and outputting signals is a VME standards compliant P0 connector.

33. The platform in claim 30, wherein said second means for inputting and outputting signals is a VME standards compliant P1 connector.

34. The platform in claim 30, wherein said second means for inputting and outputting signals is a VME standards compliant P2 connector.

35. A platform for a integrating a mass storage device with another device, comprising:
a means for transceiving having a means for inputting and outputting optical signals, an output and an input;
a first means for inputting and outputting signals having a first means for conducting a signal, said first means for conducting having a connection to said output;
a first means for bypassing having a second means for conducting signals, said second means for conducting having a connection to said first means for inputting and outputting signals and to a third means for conducting a signal, said third means for conducting a signal having a connection to said input; and
a mass storage device connected to said first means for inputting and outputting signals.

36. The platform in claim 35, wherein said mass storage device is a solid state storage device.

37. The platform in claim 35, wherein said mass storage device has a Fibre Channel standards compliant device interface.

38. The platform in claim 37, wherein said third means for conducting signals includes a second means for bypassing signals having a connection to said input.

39. The platform in claim 38, wherein said second means for bypassing includes a second input and a second output that are each connected to a second means for inputting and outputting signals.

40. A platform for a integrating a mass storage device with another device, comprising:
a means for transceiving having a means for inputting and outputting optical signals, an output and an input;
a first means for inputting and outputting signals having a first means for conducting a signal, said first means for conducting having a connection to said output;
a first means for bypassing having a second means for conducting signals, said second means for conducting having a connection to said first means for inputting and outputting signals and to a third means for conducting a signal, said third means for conducting a signal having a connection to said input; and
said first means for conducting and said second means for conducting include a second means for bypassing signals.

41. A platform for integrating a mass storage device with another device, comprising:
- a transceiving means having a first optical I/O port, a first output and a first input;
- a first I/O means having a first conducting means connecting to said first output, said first I/O means disposed to couple directly with a device external to the platform;
- a first bypass means having a second conducting means connecting to said first I/O means and a third conducting means connecting to said first input; and
- a second I/O means coupled to said first bypass means and disposed to couple directly with a device external to the platform.

42. The platform in claim 41, wherein said second I/O means is a VME standards compliant connector.

43. The platform in claim 41, wherein said first conducting means includes a driver means.

44. The platform in claim 41, wherein said second conducting means includes a driver means.

45. A platform for integrating a mass storage device with another device, comprising:
- a transceiving means having a first optical I/O port, a first output and a first input;
- a first I/O means having a first conducting means connecting to said first output;
- a first bypass means having a second conducting means connecting to said first I/O means and a third conducting means connecting to said first input;
- a second I/O means coupled to said first bypass means; and
- a mass storage device connected to said second I/O means.

46. The platform in claim 45, wherein said mass storage device has a Fibre Channel standards compliant device interface.

47. A platform for integrating a mass storage device with another device, comprising:
- a transceiving means having a first optical I/O port, a first output and a first input;
- a first I/O means having a first conducting means connecting to said first output;
- a first bypass means having a second conducting means connecting to said first I/O means and a third conducting means connecting to said first input;
- a second I/O means coupled to said first bypass means; and
- wherein said third conducting means includes a second bypass means having a connection to said first input.

48. The platform in claim 47, wherein said second bypass means includes a second input and a second output that are each connected to a third I/O means.

49. A platform for integrating a mass storage device with another device, comprising:
- a transceiving means having a first optical I/O port, a first output and a first input;
- a first I/O means having a first conducting means connecting to said first output;
- a first bypass means having a second conducting means connecting to said first I/O means and a third conducting means connecting to said first input;
- a second I/O means coupled to said first bypass means; and
- wherein said first conducting means and said second conducting means include a second bypass means.

* * * * *